(12) United States Patent
Hirsch et al.

(10) Patent No.: US 9,515,572 B2
(45) Date of Patent: Dec. 6, 2016

(54) METHOD AND DEVICE FOR CONTROLLING AN INVERTER

(71) Applicant: Robert Bosch GmbH, Stuttgart (DE)

(72) Inventors: Michele Hirsch, Esslingen (DE); Ulrich Schuster, Berlin (DE); Tino Merkel, Schwieberdingen (DE); Andrea Deflorio, Marbach am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/410,370

(22) PCT Filed: Apr. 22, 2013

(86) PCT No.: PCT/EP2013/058307
§ 371 (c)(1),
(2) Date: Dec. 22, 2014

(87) PCT Pub. No.: WO2013/189629
PCT Pub. Date: Dec. 27, 2013

(65) Prior Publication Data
US 2015/0357934 A1    Dec. 10, 2015

(30) Foreign Application Priority Data

Jun. 22, 2012   (DE) .................. 10 2012 210 652

(51) Int. Cl.
*H02P 21/00*   (2016.01)
*H02M 7/46*    (2006.01)
(Continued)

(52) U.S. Cl.
CPC ............ *H02M 7/46* (2013.01); *H02M 7/5395* (2013.01); *H02P 21/22* (2016.02); *H02P 29/0088* (2013.01); *H02M 2001/327* (2013.01); *H02P 27/08* (2013.01); *H02P 2205/01* (2013.01)

(58) Field of Classification Search
CPC ............... H02M 7/46; H02M 7/5395; H02M 2001/327; H02P 21/0035; H02P 29/0088; H02P 27/08; H02P 2205/01

USPC ..................................... 318/400.02
See application file for complete search history.

(56) References Cited

U.S. PATENT DOCUMENTS 5,631,819 A    5/1997  Masaki et al.
6,154,378 A *  11/2000 Peterson ............... H02M 5/458
                                                    363/132

(Continued)

FOREIGN PATENT DOCUMENTS

DE        10393516      10/2005
DE       102008040144    1/2010

(Continued)

OTHER PUBLICATIONS

International Search Report for Application No. PCT/EP2013/058307 dated Apr. 16, 2014 (English Translation, 2 pages).

*Primary Examiner* — Jeffrey Donels
(74) *Attorney, Agent, or Firm* — Michael Best & Friedrich LLP

(57) ABSTRACT

The invention relates to a method for controlling an inverter (10) using space-vector pulse width modulation, in particular to control an electric machine (14), the inverter (10) being equipped with a plurality of controllable switches (S) and being designed to provide a polyphase electric current (IU, IV, IW), in particular to supply polyphase electric current (IU, IV, IW) to the electric machine (14). In said method, a desired current space vector (I1*) having a desired phase angle (alpha1) and a desired amplitude (I1) is predefined, and the inverter (10) is controlled in such a way that a plurality of different successive switching states (V0-V7) is established for the switches (S) in order to provide the electric current (IU, IV, IW) in the form of a current space vector (I*), the inverter (10) being controlled in such a way that the current space vector (I2*) is provided at a phase angle (alpha2) which differs from the desired phase angle (alpha1) in order to load the switches (S) according to a desired load value (m) for the switches (S).

18 Claims, 6 Drawing Sheets

(51) Int. Cl.
  *H02P 29/00* (2016.01)
  *H02M 7/5395* (2006.01)
  *H02P 27/08* (2006.01)
  *H02M 1/32* (2007.01)

(56) References Cited

U.S. PATENT DOCUMENTS

| | | | | | |
|---|---|---|---|---|---|
| 6,201,720 | B1 * | 3/2001 | Tracy | ................ | H02M 7/53875 |
| | | | | | 363/131 |
| 6,653,812 | B1 * | 11/2003 | Huo | ................ | H02M 7/53875 |
| | | | | | 318/801 |
| 2009/0067203 | A1 | 3/2009 | Chakrabarti et al. | | |
| 2011/0149621 | A1 | 6/2011 | Damson et al. | | |
| 2014/0062356 | A1 * | 3/2014 | Djonga | ............. | H02M 7/53875 |
| | | | | | 318/400.04 |
| 2014/0084830 | A1 * | 3/2014 | Djonga | ............... | H02P 29/0088 |
| | | | | | 318/400.42 |
| 2015/0155795 | A1 * | 6/2015 | Hirsch | .................... | H02M 1/32 |
| | | | | | 318/400.26 |
| 2015/0188453 | A1 * | 7/2015 | Damson | ............ | H02M 7/53875 |
| | | | | | 318/504 |

FOREIGN PATENT DOCUMENTS

| | | |
|---|---|---|
| DE | 102009002903 | 6/2010 |
| DE | 102010064104 | 6/2012 |

\* cited by examiner

METHOD AND DEVICE FOR CONTROLLING AN INVERTER

BACKGROUND OF THE INVENTION

The present invention relates to a method for controlling an inverter by means of space vector modulation, in particular for controlling an electrical machine, wherein the inverter has a plurality of controllable switches and is designed to provide a polyphase electric current, in particular in order to supply the electrical machine with electric current in a polyphase manner, wherein a nominal current space vector having a nominal phase angle and a nominal amplitude is predefined, wherein the inverter is controlled such that a plurality of different consecutive switching states of the switches are set in order to provide the electric current in the form of a current space vector.

The present invention also relates to a device for controlling an inverter, in particular for controlling an electrical machine, wherein the inverter has a plurality of controllable switches which are connected to provide a polyphase electric current on the basis of a nominal current space vector having a nominal phase angle and a nominal amplitude, in particular to energize the electrical machine in a polyphase manner, having a control device which is designed to control the inverter such that the switches of the inverter assume a plurality of consecutive different switching states in order to provide the electric current in the form of a current space vector.

Finally, the present invention relates to a motor vehicle drivetrain having at least one electrical machine for providing drive power, an inverter for controlling the electrical machine and having a device for controlling the inverter of the type described above.

Various control methods are known in the technical field of three-phase loads in general and of three-phase electrical machines in particular. In this case, the method of space vector modulation is currently usually preferable for controlling the three-phase load. In the case of this control method, a space vector is formed by consecutive setting of eight basic voltage phasors. In order to provide the string voltage, the basic voltage phasors are switched in a pulse-width-modulated manner, with the result that a corresponding control voltage is generated.

In the case of the known control methods, the electrical loads are controlled by means of an inverter with power semiconductor switches. The eight consecutive basic voltage phasors for generating the voltage space vector are set by virtue of particular power semiconductor switches of the inverter being alternately switched on and off. In the case of very low rotation speeds of the space vector or, provided the three-phase load is an electrical machine, in the case of low speeds of the controlled electrical machines, individual ones of the power semiconductor switches are switched very often or for a very long time and are thus thermally loaded with an electric current which flows for a very long time or very often. Therefore, the power semiconductor switches must be configured for very long switch-on times and for very large currents, which results in the inverter being generally elaborate in terms of technology.

In order to respond to an overload, in particular a thermal overload, of the power semiconductor switches, it is proposed in WO 2010/000548 A2, for example, to omit one of two switching states which switch so as to be free of voltage in particular pulse-width-modulation periods in order to reduce the switching losses of the power semiconductor switches.

Since the loading, in particular thermal loading, of individual power semiconductor switches of the inverter is dependent on a phase angle of the provided current space vector or individual ones of the power semiconductor switches of the inverter are differently loaded for particular phase angles of the provided current space vector, it is proposed in DE 10393516 T1, for example, to use a particular zero vector in particular angular regions of the provided current space vector in order to reduce the switching losses of the power semiconductor switches.

It is disadvantageous here that, in specific control situations, in particular in the case of very low rotation speeds of the current space vector, individual ones of the power semiconductor switches are loaded on a permanent basis and, thus in specific situations in overloading of individual ones of the power semi conductor switches cannot be avoided.

SUMMARY OF THE INVENTION

The invention therefore provides a method for controlling an inverter by means of space vector modulation of the type mentioned at the outset, wherein the inverter is controlled such that a current space vector is provided with a phase angle which differs from the nominal phase angle in order to load the switches according to a nominal loading value.

Furthermore, the invention therefore provides a device for controlling an inverter of the type mentioned at the outset, wherein the control device is designed to control the inverter such that the current space vector is provided with a phase angle which differs from the nominal phase angle in order to load the switches according to a nominal loading value.

Finally, the invention provides a motor vehicle drivetrain having at least one electrical machine for providing drive power, an inverter for controlling the electrical machine and having a device for controlling the inverter of the type described above.

Owing to the fact that the current space vector is provided with a phase angle which is different from the nominal phase angle, in certain situations in which the controllable switch is overloaded, in particular thermally overloaded, or threatens to become overloaded, it is possible to relieve one of the controllable switches, by a current space vector with a phase angle being set which relieves the overloaded controllable switch and loads another controllable switch more heavily. As a result, the loading of the controllable switches can be varied and thus the inverter can be more evenly loaded. Thus, as a result, the switches can be loaded according to a nominal loading value, even for critical phase angles of the required current space vector. Thus, the controllable switches can be configured, in general, for lower loading values, as a result of which the inverter can generally be manufactured in a technically less elaborate and more cost-effective manner. Furthermore, by means of the more even loading of the switches, the service life of the inverter is generally lengthened.

The current space vector is preferably provided with an amplitude which differs from the nominal amplitude.

As a result, a power output, which deviates by the changed phase angle, of the inverter can be compensated for.

Furthermore, it is preferred if the phase angle and the amplitude are set such that a power output is identical to a power output corresponding to the nominal phase angle and the nominal amplitude.

As a result, the power output can be kept constant, even in the case of a changed phase angle of the current space vector, as a result of which a continual power can be provided by the inverter and the controlled load is not impaired.

Furthermore, it is preferred if a deviation of the phase angle from the nominal phase angle is set as a function of the nominal phase angle of the current space vector.

As a result, it is possible to deviate from the nominal phase angle, for particular nominal phase angles which particularly load the individual ones of the controllable switches more heavily or less heavily, as a result of which it is possible to achieve greater or lesser relief.

In this case, it is preferred if the deviation for different nominal phase angles is stored in a characteristic map.

As a result, the phase angle can be set in an optimum manner with low expenditure in terms of control technology.

Furthermore, it is preferred if the phase angle is set as a function of the losses of at least one of the controllable switches.

As a result, uneven loading of the inverter can be simply and effectively balanced.

Furthermore, it is preferred if the phase angle is varied in steps as a function of the nominal phase angle.

As a result, the expenditure in terms of control technology can be further reduced.

It is particularly preferred if the phase angle and the nominal loading value are determined, the values thus calculated are stored in a characteristic map and the inverter is controlled according to the stored values.

As a result, the expenditure in terms of control technology can be reduced and the upper and lower side of the inverter and, at the same time, the individual phases of the inverter can be loaded more evenly.

Alternatively, it is preferred if the phase angle of the current space vector is determined on the basis of characteristic field data and the inverter is correspondingly controlled, and wherein the nominal loading value is determined as a function of the losses occurring in at least two of the controllable switches.

By virtue of said renewed calculation of the nominal loading value, it is possible to react to individual situations.

Furthermore, it is preferred if the phase angle of the current space vector is determined on the basis of characteristic field data and the inverter is correspondingly controlled, and wherein the nominal loading value is determined as a function of the temperatures of at least two of the controllable switches.

By virtue of said renewed calculation of the nominal loading value, it is possible to react to individual situations with simple means.

Furthermore, it is preferred if the nominal loading value is determined as a function of the maximum and minimum possible losses, for the voltage space vector to be set, of at least one of the switches which are assigned to the high supply voltage potential and as a function of the maximum and minimum possible losses, for the voltage space vector to be set, of at least one of the switches which are assigned to the low supply voltage potential.

As a result, the actual loading of the controllable switches can be determined and the losses of both sides of the inverter can be balanced or matched to one another.

Furthermore, it is preferred if the current space vector is provided with the phase angle in order to load freewheeling diodes of the inverter according to a nominal loading value.

As a result, the freewheeling diodes of the inverter can likewise be loaded in an evenly distributed manner, as a result of which the freewheeling diodes can be dimensioned to be smaller and the corresponding service life of the freewheeling diodes is increased.

Furthermore, it is preferred if an electrical machine is controlled by means of the inverter and the nominal current space vector is determined as a function of a rotor angle of the electrical machine.

As a result, an electrical machine can be controlled, even in the case of low speeds, without individual ones of the switches being overloaded.

In this case, it is particularly preferred if the phase angle and the amplitude of the current space vector are determined such that a torque output by the electrical machine is identical to the torque which is output by means of the nominal current space vector.

As a result, the electrical machine can provide a continual torque and, at the same time, individual ones of the controllable switches can be relieved without the electrical machine experiencing power loss or stuttering.

As a result, by means of the present invention, the inverter can be evenly loaded, even in the case of low rotation frequencies of the current space vector, by a current space vector being set of which the phase angle deviates from the nominal phase angle, wherein, despite the changed phase angle, a constant torque is provided in particular in the case of control of electrical machines.

It goes without saying that features, properties and advantages of the method according to the invention also correspondingly pertain to or are applicable to the device according to the invention.

DETAILED DESCRIPTION

Figure 1:
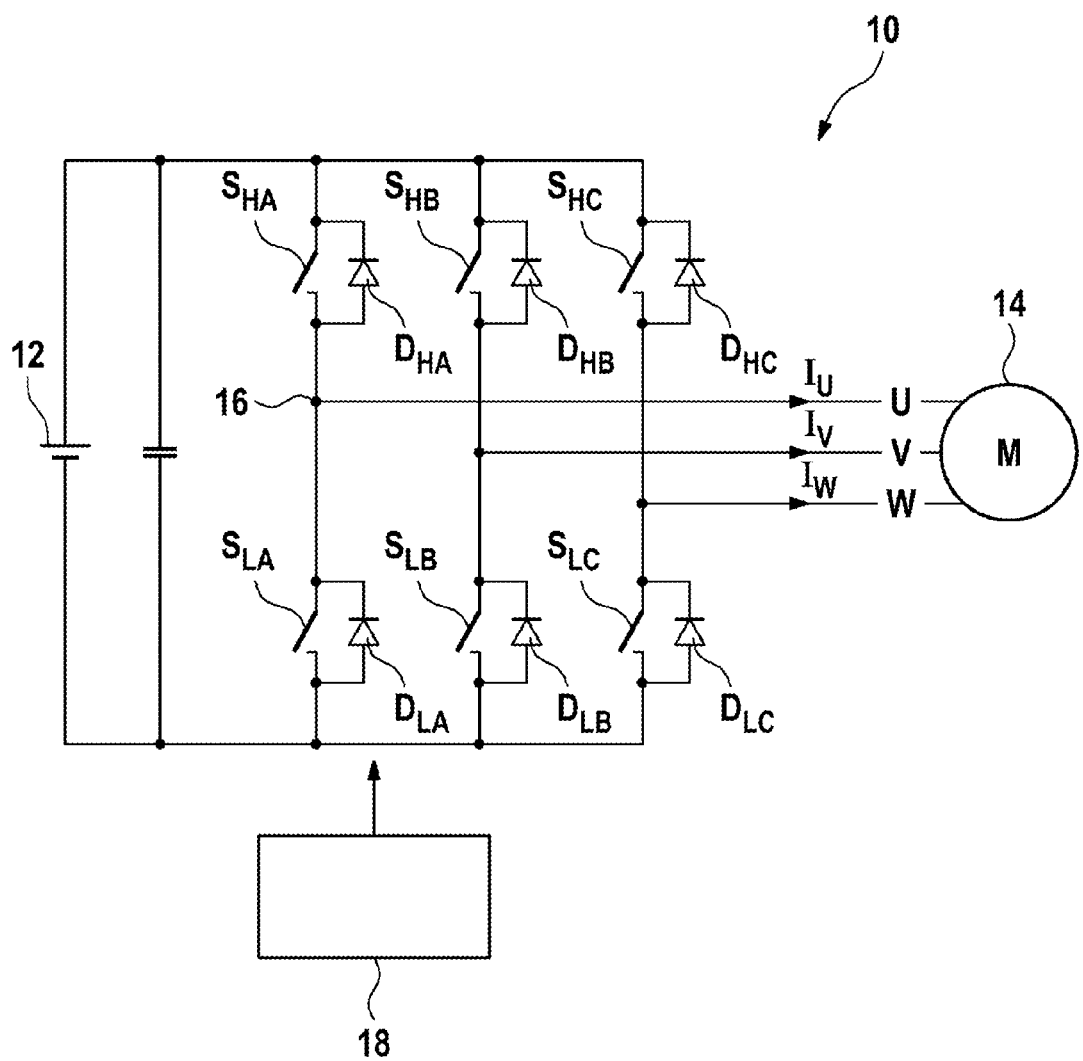
FIG. 1 schematically shows an inverter for controlling a three-phase load.

FIG. 1 schematically illustrates an inverter for controlling an electrical load, in particular an electrical machine, which inverter is generally denoted by 10.

The inverter 10 is connected to a DC voltage source 12 and is used to energize the electrical load 14, which in this case is designed as an electrical machine 14, in a three-phase fashion. The inverter has three half-bridges which are connected in parallel with the DC voltage source 12 and have in each case two controllable switches S. Between the switches S, a half-bridge tap 16 is formed in each case, which half-bridge taps are each connected to a phase conductor of the phases U, V, W of the electrical machine 14.

In each case, a freewheeling diode D which enables a flow of current in the opposite direction is connected in parallel with the switches S.

In FIG. 1, the switches S are denoted by SHA, SLA, SHB, SLB, SHC, SLC corresponding to the phase U, V, W which they provide and corresponding to the assignment to a high potential of the DC voltage source 12 or to a low potential of the DC voltage source 12. Correspondingly, the freewheeling diodes are denoted by DHA, DLA, DHB, DLB, DHC, DLC.

By alternating opening and closing of the switches S, in each case a control voltage is applied between the phase conductors U, V, W, with the result that in each case a phase current IU, IV, IW which drives the electrical machine 14 is correspondingly set. The inverter 10 is preferably designed using semiconductor switches. The switches of the inverter are alternately opened and closed by means of a schematically illustrated control unit 18 in order to provide the phase voltages with a particular profile and to provide a rotating voltage space vector and to correspondingly energize the electrical machine 14 with the phase currents IU, IV, IW. In this case, the voltage phasor is provided by the inverter 10, whereupon the current space vector is correspondingly set as a function of the controlled load.

Figure 2:
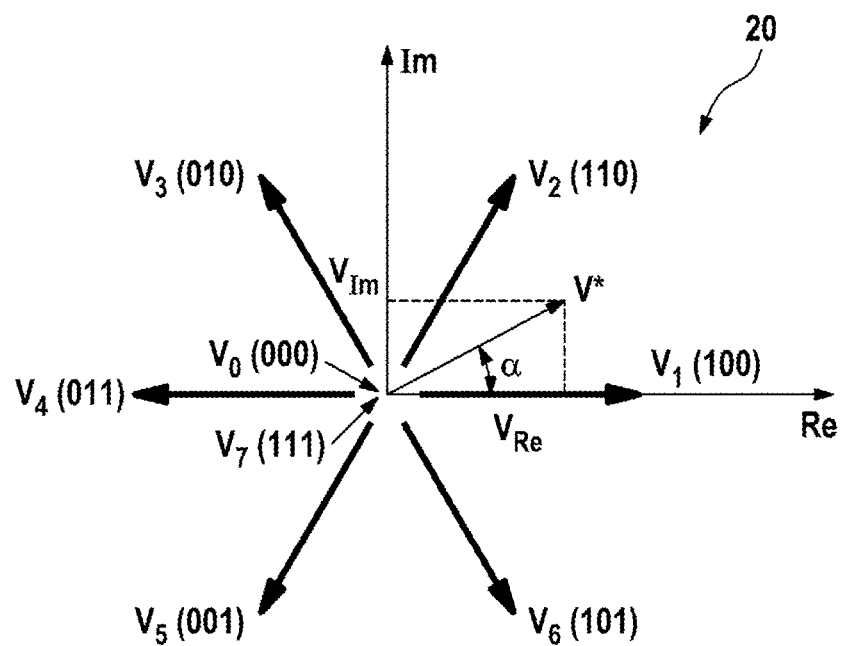
FIG. 2 shows a complex phasor diagram to explain the space vector modulation method for controlling the inverter of a three-phase load.

FIG. 2 illustrates a complex phasor diagram to explain the space vector modulation for controlling the electrical load 14 or the electrical machine 14, which complex phasor diagram is generally denoted by 20.

The phasor diagram 20 illustrates a voltage phasor V* with a control angle alpha of the electrical machine 14. The phasor diagram 20 also illustrates six basic voltage phasors V1, V2, V3, V4, V5, V6 which arise when one or two of the switches S of the inverter 10 are closed and the electrical machine is correspondingly controlled. In order to set the voltage phasor V* with a maximum length, which has the control angle alpha between the basic voltage phasors V1 and V2 in this example, said voltage phasor V* is realized by alternate control of the inverter 10 corresponding to the basic voltage phasor V1 and the basic voltage phasor V2. The two basic voltage phasors V1, V2 are alternately set with a predefined switching frequency, with the result that the voltage phasor V* with a phase angle of 30° arises in the case of even switch-on times of the basic voltage phasors V1, V2. If a voltage phasor V* with a larger control angle alpha must be set, the switch-on time of the basic voltage phasor V2 is correspondingly increased and the switch-on time of the basic voltage phasor V1 is reduced. Thus, by clocked control of the switches S of the inverter 10, the voltage space vector V* can be realized with any control angle alpha.

If the voltage phasor V*, as in the case illustrated in FIG. 2, is to be set with a lower magnitude (smaller length) than the basic voltage space vectors V1, V2, a zero voltage phasor V0, V7 is correspondingly set, in the case of which the switches SHA, SHB, SHC on the upper side or SLA, SLB, SLC on the lower side of the inverter 10 are opened. The respective other ones of the switches S are correspondingly closed. Correspondingly, the voltage phasor V* can be realized by a combination of the basic voltage space vectors V1 and V2 and one of the zero voltage phasors V0, V7.

A current space vector I* is set as a function of the voltage space vector V*. The current space vector I* has an amplitude and a phase angle which are set as a function of the controlled electrical load 14. The phase angle of the current space vector I* can be in phase with the phase angle α of the voltage space vector V* or can have a phase shift.

In order to energize the electrical load 14 or the electrical machine 14, the voltage space vector V* is provided by the different basic voltage space vectors V1-V6 and the zero voltage space vectors V0, V7 being set consecutively in quick succession. As a result, the different switches S and the different freewheeling diodes D of the inverter 10 are evenly loaded, in particular evenly loaded in phase, in the case of a voltage space vector V* which rotates in a correspondingly rapid manner. If the rotation frequency of the voltage space vector V* is very low or zero, for example in the case of low speeds of the electrical machine 14, the corresponding switches S and the freewheeling diodes D of the inverter 10 of a phase U, V, W are loaded over a long period of time, with the result that the corresponding switches S and the freewheeling diodes D can be overloaded and the switches S and the freewheeling diodes D of the inverter 10 are generally loaded unevenly, in particular out of phase. In order to prevent overloading of individual ones of the switches S and the freewheeling diodes D, measures must be taken to distribute the loading to different ones of the switches S and the freewheeling diodes D.

Figure 3:
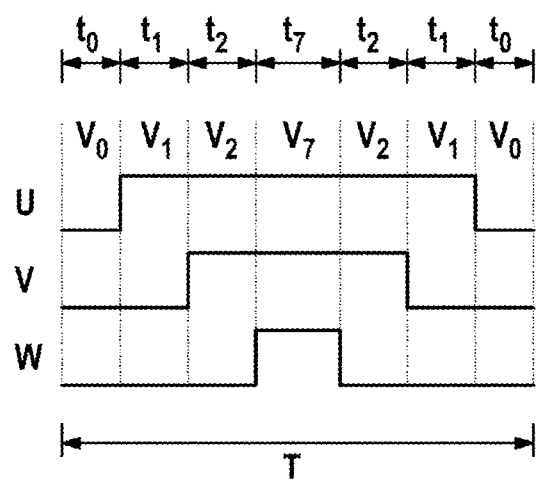
FIG. 3 schematically shows a profile of three string voltages for setting different voltage space vectors.

FIG. 3 illustrates profiles of the phase voltages of the three phases U, V, W within a pulse-width-modulation period T, in order to set the basic voltage space vectors V0, V1, V2, V7 consecutively. Within the pulse-width-modulation period T, a switch-on time t0, t1, t2, t7 of the individual basic voltage space vectors V0, V1, V2, V7 can be varied in order to be able to precisely set the voltage space vector V*.

Figure 4:
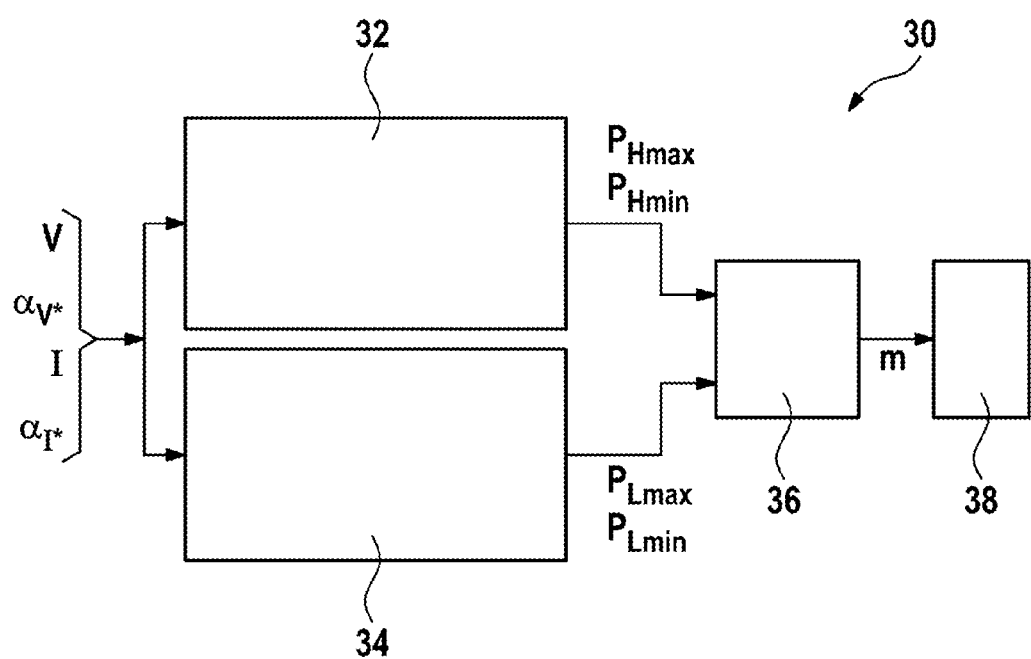
FIG. 4 schematically shows a sequence for determining a nominal loading value of the switches or the freewheeling diodes of the inverter.

FIG. 4 illustrates in principle the determination of a nominal loading value m, which is generally denoted by 30. By means of the nominal loading value m, the basic goal is to load the switches SHA, SHB, SHC, which are assigned to a high voltage potential of the voltage source 12, and the switches SLA, SLB, SLC, which are assigned to a low voltage potential of the voltage source 12, evenly or as evenly as possible. In this case, the switches SHA, SHB, SHC, which are assigned to the high voltage potential of the voltage source 12, are denoted as upper switches SH below and the switches SLA, SLB, SLC, which are assigned to the low voltage potential of the voltage source 12, are denoted as lower switches SL below.

The magnitude V of the voltage space vector V*, the phase angle alpha_V of the voltage space vector V*, the magnitude I of the current space vector I* and the phase angle alpha_I of the current space vector I* are used as input variables.

Firstly, one of the upper switches SH or one of the upper freewheeling diodes DH is selected, which switch or freewheeling diode has the maximum losses of the upper side for the voltage space vector V* to be set. For this switch SH or this freewheeling diode DH, the maximum possible losses P_Hmax are theoretically determined for the voltage space vector V* to be set for the case in which only V7 is used as zero voltage phasor. Furthermore, the minimum possible losses P_Hmin of said switch SH or said freewheeling diode DH are theoretically determined for the voltage space vector V* to be set for the case in which only V0 is used as zero voltage phasor, as is shown at 32. At 34, the lower switch SL or the lower freewheeling diode DL is correspondingly selected, which switch has the maximum losses of the lower switches SL or the lower freewheeling diodes DL for the voltage space vector V* to be set. For this switch SL or this freewheeling diode DL, the maximum possible losses P_Lmax and the minimum possible losses P_Lmin are determined for the voltage space vector V* to be set for the case in which only V0 or V7 is used as zero voltage phasor.

From said loss values, a new loading value m is calculated at 36 and, what is more, using the formula:

$$m = \frac{P_{Lmax} - P_{Hmin}}{P_{Hmax} - P_{Hmin} + P_{Lmax} - P_{Lmin}}$$

The loading value m determined in this way distributes the thermal loading of the inverter 10 on the upper and lower side such that the losses on the upper side are identical to the losses on the lower side. At 38, the switch-on times t0-t7 are calculated in order to set the selected loading value m and to correspondingly load the switches S and the freewheeling diodes D more evenly.

Since the freewheeling diodes D and the switches S have different loading limits, the losses $P_D$, $P_S$ of the freewheeling diodes D and the switches S must be adapted to one another or factorized in order to be able to be compared with one another. Therefore, a comparison power loss $P_{DV}$ is determined for the freewheeling diodes D, and, what is more, using the formula:

$$P_{DV} = c \cdot P_D$$

Wherein $P_{DV}$ is the comparison power loss of the freewheeling diodes, $P_D$ is the freewheeling diode losses and the factor c is a constant. In a particular embodiment, the factor c can also be a function of the power loss $P_D$ of the freewheeling diodes D.

Furthermore, it also becomes clear that the losses $P_D$, $P_S$ of the switches S and the freewheeling diodes D are exclusively a function of the magnitude V of the voltage space vector V*, the phase angle alpha_V, the magnitude I of the current space vector I* and the phase angle alpha_I.

In an alternative embodiment of the method 30, instead of the power losses P, the electric current I in the respective component S, D and/or the square of the electric current $I^2$ in the respective component S, D is used in order to determine the nominal loading value m.

Figure 5:
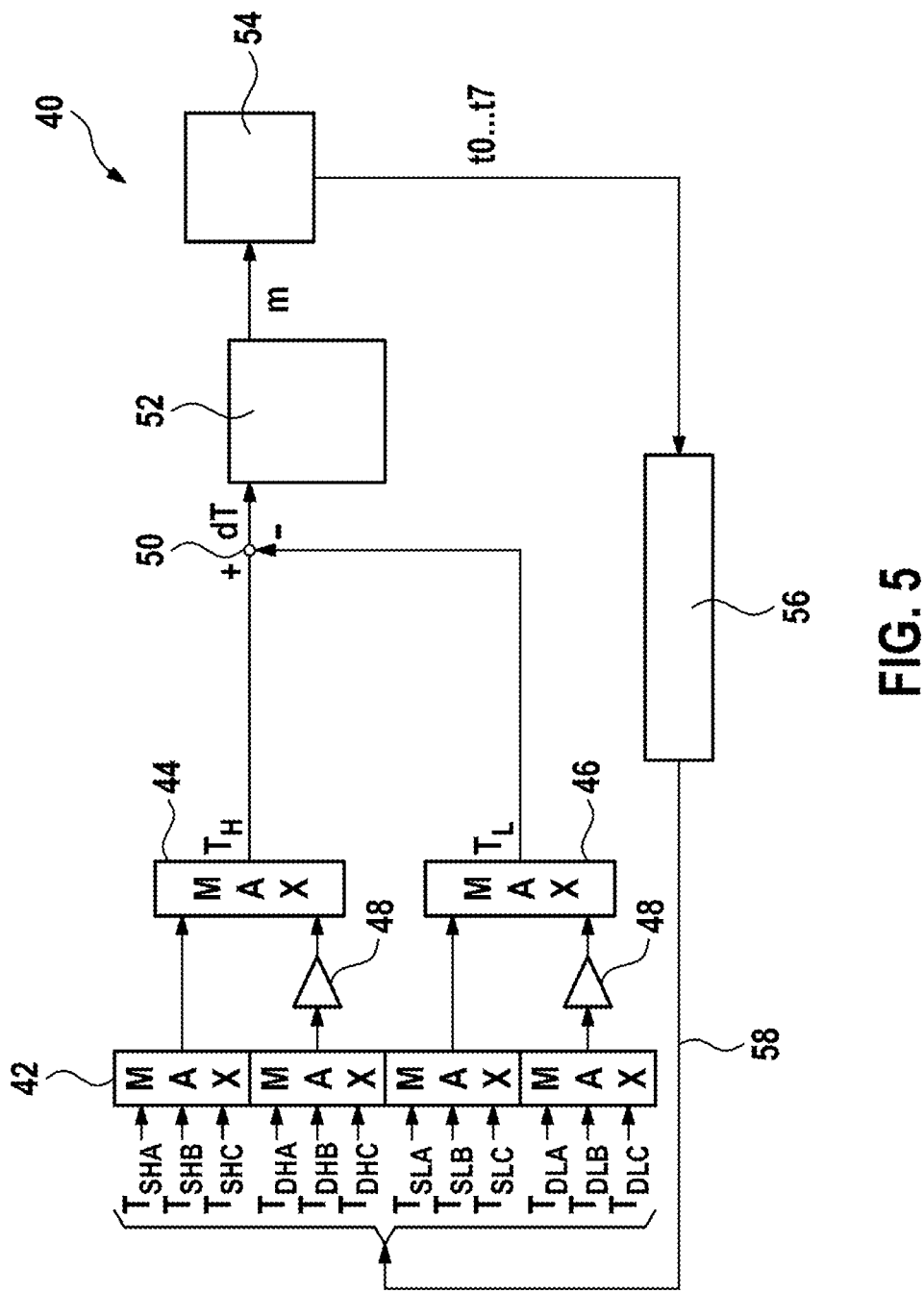
FIG. 5 schematically shows a detailed sequence for determining a nominal loading value on the basis of temperature measurements or estimates.

FIG. 5 illustrates a method in order to determine the loading value m on the basis of an estimated or measured temperature $T_D$, $T_S$ of the switches S and/or of the freewheeling diodes D and to calculate a new nominal loading value m. In FIG. 5, the method is generally denoted by 40.

In the case of the method 40, the nominal loading value m is determined during operation as a function of the temperatures of the switches S or the freewheeling diodes D. In general, the temperatures $T_D$, $T_S$ of the switches S and the freewheeling diodes D are used as input variables. At 42, the most heavily loaded upper switch SH, the most heavily loaded upper freewheeling diode DH, the most heavily loaded lower switch SL and the most heavily loaded lower freewheeling diode DL are calculated by means of the temperatures $T_D$, $T_S$. In other words, the respective component which has the highest temperature is calculated. From said temperatures, at 44 and 46, the maximum temperature T_H of the upper switches and/or the upper freewheeling diodes is calculated or the maximum temperature T_L of the lower side is calculated from the losses of the lower side. In this case, the temperature $T_D$ of the freewheeling diodes D is factorized in order to be able to compare the temperatures of the switches and the freewheeling diodes D, as is shown at 48. In other words, in order to be able to compare the temperatures of the switches S and the freewheeling diodes D, a comparison temperature of the freewheeling diodes is determined, using the formula:

$$T_{DV} = c \cdot T_D$$

wherein $T_{DV}$ is the comparison temperature, $T_D$ is the temperature of the freewheeling diodes D and the factor c is a constant. In a particular embodiment, the factor c can also be a function of the power loss $P_D$ of the freewheeling diodes D. At a summing point 50, the difference dT between the maximum temperature T_H of the upper side and the maximum temperature T_L of the lower side is calculated. At 52, an amended nominal loading value m is determined as a function of the temperature difference dT in order to correspondingly compensate the temperature difference dT. If the temperature difference dt>0, the nominal loading value m is reduced and if the temperature difference dT<0, the nominal loading value m is increased. As a function of the nominal loading value m determined in this way, new switch-on times t0-t7 are determined at 54 for the following pulse-width-modulation period T. As a function of the new pulse-width-modulation period T, amended temperatures $T_D$, $T_S$ of the switches S and the freewheeling diodes D are calculated, as is shown at 56, and are provided as new input variables for the method 40, as is indicated by the feedback 58. As a result of this, on the basis of the measured or estimated temperature of the switches S and/or the freewheeling diodes D, a new nominal loading value m can be determined for each pulse-width-modulation period T in order to more evenly load the corresponding switches S and freewheeling diodes D according to the new nominal loading value m. Owing to the comparison of the temperature of the components of the upper side and of the lower side, and owing to the adaptation of the loading value m, the components of the upper side can be more evenly loaded relative to the components of the lower side.

In an alternative embodiment of the method 40, instead of the temperatures of the components S, D, power losses are used to determine the nominal loading value m, which power losses are calculated or determined by integration of the power loss of the respective component S, D or by integration of the electric current I in the respective component S, D and/or by integration of the square of the electric current $I^2$ in the respective component S, D over a predefined period of time.

In another embodiment of the method 40, instead of the temperatures of the components S, D, the electrical losses P or the electric current I in the respective component S, D and/or the square of the electric current $I^2$ in the respective component S, D are used to determine the nominal loading value m, which electrical losses or electric currents are in each case filtered by means of a low-pass filter.

Figure 6:
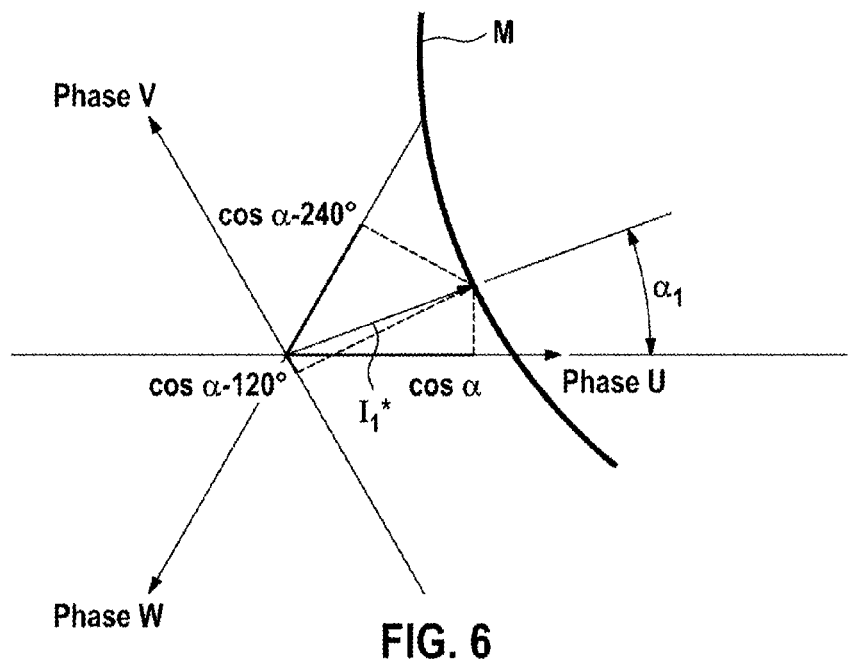
FIG. 6 schematically shows a complex phasor diagram for setting a current space vector.

FIG. 6 schematically illustrates a complex phasor diagram of the current space vector I1*. The current space vector I1* has a magnitude I1 and a phase angle alpha1. If the inverter 10, which sets the current space vector I1*, is used to control the electrical machine 14, a torque M is provided by the current space vector I1*. In the complex phasor diagram in FIG. 6, the individual phases U, V, W are illustrated at an angle of 120 degrees with respect to one another. A projection of the current space vector I1* onto the corresponding phases U, V, W corresponds in this case to the current which is set in the associated switch S. By means of said projection, which is indicated by the dashed lines, the loading of the individual switches S or freewheeling diodes D can thus be directly read off. In the illustrated example from FIG. 6, the switch SHA is thus loaded most heavily by the phase U, the switch SHC being loaded less by the phase W, while the switch SHA and the switch SHB are loaded very lightly by the phase V.

FIG. 6 illustrates the provided torque M of the connected electrical machine 14 as a curve, which at the same time represents a curve of constant torque M. The torque M output by the electrical machine 14 is a function of an angle theta by which the current phasor I* runs ahead of the electrical rotor angle of the electrical machine 14 and the amplitude I of the current space vector I1*: M=f(theta, I). It can be seen from this that the torque M which is output by the electrical machine 14 is constant, provided the current space vector I1* follows the line of constant torque M illustrated in FIG. 6.

The current space vector I1* is set such that it runs ahead of an electrical rotor angle of the electrical machine 14 in order to provide the torque M by means of the electrical machine 14. The current space vector I1* runs ahead of the rotor of the electrical machine 14 by an angle theta≥45 degrees. This becomes clear through the formula:

$$\text{alpha\_I} = \text{alpha\_R} + \text{theta},$$

wherein alpha_I is the phase angle of the current space vector I1*, alpha_R is the electrical angle of the rotor of the electrical machine 14 and theta is the difference angle.

The difference angle theta is usually between 90 degrees and 180 degrees during operation of the motor. The current space vector I1* or the nominal current space vector I1* is set such that the inverter 10 and the electrical machine 14 have an optimum efficiency for the electrical rotor angle alpha_R.

Figure 7:
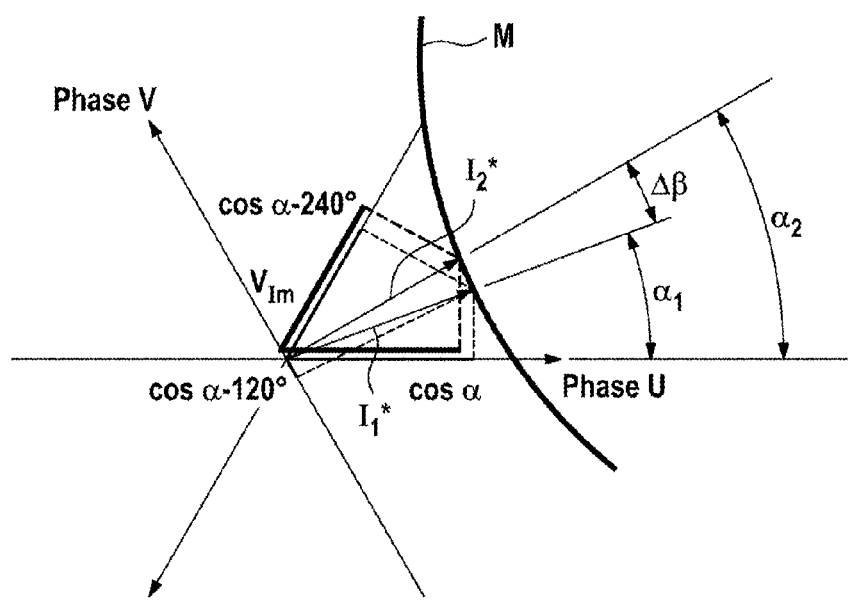
FIG. 7 shows a complex phasor diagram for setting an alternative current space vector.

A variation of the phase angle alpha_I of the current space vector is schematically illustrated in a complex phasor diagram in FIG. 7.

In the complex phasor diagram illustrated in FIG. 7, the nominal current space vector I1* with the phase angle alpha1 and the magnitude I1 is illustrated and the current space vector I2* with the phase angle alpha2 and the magnitude I2. The nominal current space vector I1* is in this case the current space vector at which the inverter 10 and the electrical machine 14 have an optimum efficiency. Both current space vectors I1*, I2* output the same torque M since they run on the line of even torque M. The nominal current space vector I1* is identical to the current phasor I1* from FIG. 6. The current space vector I2* has a phase angle alpha2 which is greater than the phase angle alpha1 of the nominal current space vector I1*. The difference between the phase angles alpha1 and alpha2 is denoted as delta_beta in FIG. 7. delta_beta can have different values as a function of the phase angle alpha1 and fluctuate at most between +30° and −30°. By means of the projection, illustrated in FIG. 7, of the current space vector I2* onto the corresponding phase axes of the phases U, V, W, it becomes clear that the current in the phase U, that is to say in the switch SHA, is reduced with respect to I1* and the current in the phase W, that is to say in the switch SHC and the freewheeling diode DLC, is increased. In total, owing to the larger magnitude of the current space vector I2*, the current loading is greater than in the case of the nominal current space vector I1*; however, by virtue of this measure, as can be seen in FIG. 7, the loading of the most heavily loaded switch SHA and the freewheeling diode DLA can be reduced. As a result, peak loading of the most heavily loaded switches S and also the most heavily loaded freewheeling diodes D can be reduced and the loading can be distributed to other switches S or freewheeling diodes D. As a result, the inverter 10 can be loaded more evenly in phase. Since the current phasor I2* follows the line of even torque M, an identical torque M is provided by the electrical machine 14, with the result that this measure does not represent a restriction for the user of the electrical machine 14 and, for example, no stuttering or drop occurs in the torque M. By virtue of the setting of the current space vector I2*, which deviates from the nominal current space vector I1*, the losses in the individual phases U, V, W can be distributed and thus overloading of individual components of individual phases can be avoided. In other words, a more even loading of the phases U, V, W can thus be achieved.

As a result, by providing an alternative current space vector I2* with a phase angle alpha2 deviating from the nominal phase angle alpha1, a reduction of the most often loaded switch SHA and the freewheeling diode DLA or the most heavily loaded phase U can thus be achieved and thus the inverter 10 can be generally more evenly loaded.

If the freewheeling diodes D can be heavily loaded, delta_beta can also be set with a negative value in order to relieve individual ones of the switches S. In the control situation illustrated in FIG. 7, the switch SHA is firstly relieved by selection of the zero voltage phasor V0 and thus the freewheeling diode DLA is more heavily loaded. As a result, the switches SLB, SLC are also more heavily loaded. For the phase angle alpha_1, the freewheeling diode DLA is then loaded most heavily, the switch SLC is loaded least heavily and the switch SLB is loaded very lightly. In this situation, by means of a phase angle alpha_2 which is smaller than alpha_1, that is to say with a negative deviation angle delta_beta, the freewheeling diode DLA can be loaded more heavily, as a result of which the switch SLC is relieved, however, and the switch SLB is more heavily loaded. Thus, the loading of the switches SLB and SLC can be more evenly distributed. However, this takes place at the cost of a heavier loading of the freewheeling diode DLA.

In other words, the loading is firstly displaced from an upper switch SH to a lower freewheeling diode DL and, what is more, by selection of a suitable temporal distribution of the zero voltage phasors V0, V7 and then the loading is distributed to the phases U, V, W in the case of the zero voltage phasor V0, V7 by setting the deviation angle delta_beta. Thus, in general, the loading of the switches S and the freewheeling diodes D can be set more evenly.

Preferably, the method 40 from FIG. 5 is combined with the setting of the alternative current space vector I2* from FIG. 7. In this case, for example before controlling the inverter 10, that is to say in the control device 18, for example, an optimized nominal loading value m and, at the same time, also an optimized current space vector I2* are determined according to the method 30 on the basis of the nominal current space vector I1*. These values are stored in a characteristic map and the electrical machine 14 is controlled on the basis of the values of the characteristic map. In other words, the nominal loading value m and the current space vector I2* are determined offline and the electrical machine is correspondingly controlled.

As an alternative to this, the optimized current space vector I2* can be removed from the characteristic map and the nominal loading value m can be determined during operation of the electrical machine 14 according to the method 30 or 40 on the basis of measured values or estimated values and can be correspondingly optimized in a continual manner. In other words, the nominal loading value m is determined online and adapted.

Figure 8:
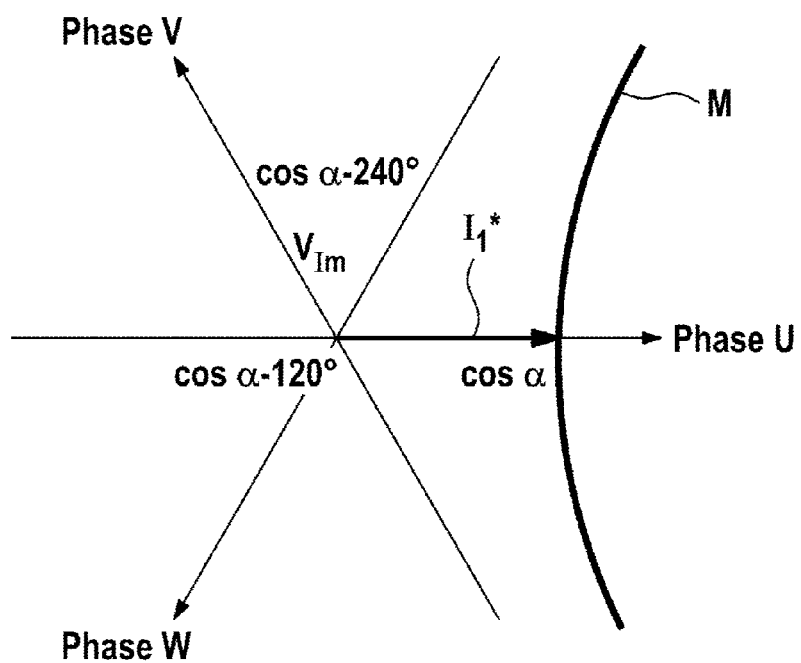
FIG. 8 shows a complex phasor diagram for setting a current space vector with a phase angle of zero degrees.

FIG. 8 schematically illustrates a complex phasor diagram according to FIGS. 6 and 7 for a nominal current space vector I1* of zero degrees. FIG. 8 also illustrates the line of even torque M. The line of even torque M has a curvature such that it is not possible to relieve the phase U or to relieve the corresponding switch SHA by providing a current space vector I2* with a deviating phase angle. By contrast, by means of a greater or smaller phase angle alpha2, the loading of the switch SHA would remain the same or even increase and, furthermore, a further switch of the phase W or the phase V would additionally be loaded. Corresponding profiles of the line of even torque arise for phase angles according to the axes of the phases U, V, W, that is to say for the angles 0 degrees, 60 degrees, 120 degrees, 180 degrees, 240 degrees, 300 degrees, etc. Control by means of a deviating phase angle alpha2 does not make sense for these phase angles alpha1. Control by means of the deviating phase angle alpha2 for phase angles alpha1 in the region of 30 degrees, 90 degrees, 150 degrees, etc. is particularly sensible.

In order to reduce the expenditure in terms of control technology, it is possible, at particular nominal phase angles alpha1, to store data relating to the current space vectors I2* in a characteristic map. The characteristic map can also take into account that the phase angles of the nominal current space vector I1* and the phase angles of the voltage space vector V1* can deviate from one another at particular frequencies.

The invention claimed is:

1. A method for controlling an inverter (10) by space vector modulation wherein the inverter (10) has a plurality of controllable switches (S) and is configured to provide a polyphase electric current (IU, IV, IW), the method comprising:
    predefining a nominal current space vector (I1*) having a nominal phase angle (alpha1) and a nominal amplitude (I1),
    controlling the inverter (10) such that a plurality of different consecutive switching states (V0-V7) of the switches (S) are set in order to provide the electric current (IU, IV, IW) in the form of a current space vector (I1*), and
    further controlling the inverter (10) such that the current space vector (I2*) is provided with a phase angle (alpha2) which differs from the nominal phase angle (alpha1) in order to load the switches (S) according to a nominal loading value (m).

2. The method as claimed in claim 1, further comprising providing the current space vector (I2*) with an amplitude (I2) which differs from the nominal amplitude (I1).

3. The method as claimed in claim 1, further comprising setting the phase angle (alpha2) and the amplitude (I2) such that a power output is identical to a power output corresponding to the nominal phase angle (alpha1) and the nominal amplitude (I1).

4. The method as claimed in claim 1, further comprising setting a deviation (beta) of the phase angle (alpha2) from the nominal phase angle (alpha1) as a function of the nominal phase angle (alpha1) of the nominal current space vector (I1*).

5. The method as claimed in claim 4, further comprising storing the deviation (beta) for different nominal phase angles (alpha1) in a characteristic map.

6. The method as claimed in claim 1, further comprising setting the phase angle (alpha2) as a function of the losses of at least one of the controllable switches (S).

7. The method as claimed in claim 1, further comprising varying the phase angle (alpha2) in steps as a function of the nominal phase angle (alpha1).

8. The method as claimed in claim 1, further comprising determining the phase angle (alpha2) and the nominal loading value (m), storing the values thus calculated in the characteristic map and controlling the inverter (10) on the basis of the stored values of the characteristic map.

9. The method as claimed in claim 1, further comprising determining the phase angle (alpha2) of the current space vector (I2*) on the basis of characteristic map data and correspondingly controlling the inverter (10), and determining the nominal loading value (m) as a function of the losses of at least two of the controllable switches (S).

10. The method as claimed in claim 1, further comprising providing the current phasor (I2*) with the phase angle (alpha2) in order to load freewheeling diodes (D) according to a nominal loading value (m) of the inverter (10).

11. The method as claimed in claim 1, further comprising determining the nominal loading value (m) as a function of the maximum and minimum possible losses (P_Hmax, P_Hmin) of at least one of the switches (SH) which are assigned to the high supply voltage potential and as a function of the maximum and minimum possible losses (P_Lmax, P_Lmin) of at least one of the switches (SL) which are assigned to the low supply voltage potential.

12. The method as claimed in claim 1, wherein an electrical machine (14) is controlled by the inverter (10) and the nominal current space vector (I1*) is determined as a function of a rotor angle (alpha_R) of the electrical machine.

13. The method as claimed in claim 12, further comprising determining the phase angle (alpha2) and the amplitude of the current space vector (I2*) such that a torque (M) output by the electrical machine (14) is identical to the torque (M) which is output by the nominal current space vector (I1*).

14. An inverter system, the system comprising:
    an inverter (10) including a plurality of controllable switches (S) which are connected in order to provide a polyphase electric current (IU, IV, IW) on the basis of a nominal current space vector (I1*) having a nominal phase angle (alpha1) and a nominal amplitude (I),
    a control device (18) configured to control the inverter (10) such that the switches (S) of the inverter (10) assume a plurality of consecutive different switching states (V0-V7) in order to provide the electric current (IU, IV, IW) in the form of a current space vector (I*), and such that the current space vector (I2*) is provided with a phase angle (alpha2) which differs from the nominal phase angle (alpha1) in order to load the switches (S) according to a nominal loading value (m).

15. A motor vehicle drivetrain having at least one electrical machine (14) for providing drive power, and having a system as claimed in claim 14 for controlling the electrical machine.

16. The method as claimed in claim 1, wherein the inverter (10) drives an electrical machine (14).

17. The method as claimed in claim 16, wherein the inverter (10) supplies the electrical machine (14) with the electric current (IU, IV, IW) in a polyphase manner.

18. The device (18) as claimed in claim 14, wherein the inverter (10) drives an electrical machine (14).

* * * * *